US010866892B2

United States Patent
Kotha et al.

(10) Patent No.: US 10,866,892 B2
(45) Date of Patent: Dec. 15, 2020

(54) ESTABLISHING DEPENDENCY IN A RESOURCE RETRY QUEUE

(71) Applicant: Apple Inc., Cupertino, CA (US)

(72) Inventors: Sridhar Kotha, San Jose, CA (US); Neeraj Parik, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/102,542

(22) Filed: Aug. 13, 2018

(65) Prior Publication Data

US 2020/0050548 A1  Feb. 13, 2020

(51) Int. Cl.
*G06F 9/46* (2006.01)
*G06F 12/0815* (2016.01)
*G06F 12/0804* (2016.01)

(52) U.S. Cl.
CPC ...... *G06F 12/0815* (2013.01); *G06F 12/0804* (2013.01); *G06F 2212/1041* (2013.01)

(58) Field of Classification Search
None
See application file for complete search history.

(56) References Cited

U.S. PATENT DOCUMENTS

| | | | | |
|---|---|---|---|---|
| 5,813,033 A * | 9/1998 | Pflum | ............... | G06F 9/30152 711/119 |
| 5,991,819 A | 11/1999 | Young | | |
| 6,026,461 A | 2/2000 | Baxter et al. | | |
| 6,216,200 B1 * | 4/2001 | Yeager | ............... | G06F 9/3834 711/100 |
| 6,279,080 B1 * | 8/2001 | DeRoo | ............... | G06F 12/0804 711/135 |
| 6,295,581 B1 * | 9/2001 | DeRoo | ............... | G06F 11/182 710/52 |
| 6,487,643 B1 * | 11/2002 | Khare | ............... | G06F 12/0815 711/148 |
| 8,645,639 B2 | 2/2014 | Krishnan et al. | | |
| 9,396,122 B2 * | 7/2016 | Biswas | ............... | G06F 12/0871 |
| 9,710,226 B1 * | 7/2017 | Zheng | ............... | G06F 13/1626 |
| 2006/0236040 A1 * | 10/2006 | Uehara | ............... | G06F 12/0831 711/150 |
| 2014/0173218 A1 * | 6/2014 | Saund | ............... | G06F 12/0822 711/141 |
| 2015/0128142 A1 * | 5/2015 | Fahim | ............... | G06F 9/4881 718/102 |

* cited by examiner

*Primary Examiner* — Ryan Bertram
*Assistant Examiner* — Trang K Ta
(74) *Attorney, Agent, or Firm* — Kowert, Hood, Munyon, Rankin & Goetzel, P.C.

(57) ABSTRACT

A memory cache controller includes a transaction arbiter circuit and a retry queue circuit. The transaction arbiter circuit may determine whether a received memory transaction can currently be processed by a transaction pipeline. The retry queue circuit may queue memory transactions that the transaction arbiter circuit determines cannot be processed by the transaction pipeline. In response to receiving a memory transaction that is a cache management transaction, the retry queue circuit may establish a dependency from the cache management transaction to a previously stored memory transaction in response to a determination that both the previously stored memory transaction and the cache management transaction target a common address. Based on the dependency, the retry queue circuit may initiate a retry, by the transaction pipeline, of one or more of the queued memory transactions in the retry queue circuit.

20 Claims, 8 Drawing Sheets

ESTABLISHING DEPENDENCY IN A RESOURCE RETRY QUEUE

BACKGROUND

Technical Field

Embodiments described herein are related to the field of memory systems, and more particularly to the management of memory transactions in a memory system.

Description of the Related Art

Computer systems, including systems-on-a-chip (SoCs), may include processors and multiple memory circuits that store software programs or applications, as well as data being operated on by the processors. These multiple memory circuits may comprise a hierarchy of cache memories and system memories, based on characteristics such as storage capacity and access time. Smaller capacity memories with faster access times may be used as cache memories, storing instructions and/or data for faster access by processing circuits. Larger capacity, slower access memories may be used as system memory, storing more information that may not be used frequently as cached information.

A memory cache controller circuit receives requests to access memory in the form of memory transactions. Each memory transaction may include a request to read, write, or manage information stored in one or more cache memories. Memory cache controller processes the memory transaction and may return requested data in response to a read request or return an acknowledgement of completion in response to a write request. Some of these memory transactions may be processed upon reception by the memory cache controller if resources are available to process the requests. A portion of the memory transactions, however, may utilize a resource of the memory system that is currently busy fulfilling other requests. Requests utilizing unavailable resources may be identified and queued until the proper resources are available. This process of queueing a memory transaction request until memory resources are available may be referred to as "resource retry."

SUMMARY OF THE EMBODIMENTS

Broadly speaking, a system, an apparatus, and a method are contemplated in which the apparatus includes a retry queue circuit and a transaction arbiter circuit. The transaction arbiter circuit may determine whether a received memory transaction can currently be processed by a transaction pipeline. The retry queue circuit may queue memory transactions that the transaction arbiter circuit determines cannot be processed by the transaction pipeline. The retry queue circuit, in response to receiving a memory transaction that is a cache management transaction, may establish a dependency from the cache management transaction to a previously stored memory transaction in response to a determination that both the previously stored memory transaction and the cache management transaction target a common address. Based on the dependency, the retry queue circuit may also initiate a retry, by the transaction pipeline, of one or more of the queued memory transactions in the retry queue circuit.

In some embodiments, to initiate a retry of one or more of the queued memory transactions in the retry queue circuit, the retry queue circuit may wait to retry the cache management transaction until the previously stored memory transaction has been processed. In particular implementations, an entry for a transaction stored in the retry queue circuit may include one or more data bits for storing a victim address. To establish the dependency from the cache management transaction to the previously stored memory transaction, the retry queue circuit is further configured to store an address value in the data bits for the victim address.

In some implementations, the retry queue circuit may identify, in response to a determination that the different memory transaction includes an indication of a victim address that corresponds to the common address, a different dependency from the cache management transaction to a different memory transaction previously stored in the retry queue circuit. In various embodiments, the apparatus may also include a cache management circuit configured to generate the cache management transaction. The cache management transaction may include a management command for a cache memory.

In particular implementations, the management command may include a command to flush a portion of the cache memory. In various implementations, the retry queue circuit may establish the dependency, in response to a determination that the previously stored memory transaction would return erroneous data if processed after the cache management transaction.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Some computer systems include a hierarchical memory system which may include a system memory that has a large data storage capacity, but also have long memory access times. The hierarchical memory system can also include one or more levels of cache memory may be utilized to provide a limited amount of storage with shorter memory access times. Each level of cache memory can include multiple caches. For example, one memory system may include three levels of cache, L1, L2, and L3, in which L1 includes four cache memories, L2 includes 2 cache memories, and L3 includes a single cache memory. A memory cache controller circuit may be included for each cache memory, or one memory cache controller for each level of cache. In some cases, a single memory cache controller may be included for all levels of cache.

The memory system may be accessed by one or more agents within a computer system, such as processing cores, graphics cores, networking processors, security processors, and the like. These agents issue requests to access previously stored data and/or instructions, or request to store data in various locations in the memory system. Such memory retrieval and storage requests are commonly referred to as memory transaction. As used herein, a "memory transaction" or simply "transaction" refers to a request, and subsequent response, to read, write, modify, or manage content (e.g., data or instructions) stored in a memory location corresponding to a particular location in memory. When memory transactions are issued by the agents, one or more memory cache controllers may receive the issued memory transactions, based on the agent that issued the transaction. The memory cache controller processes the memory transaction based on data currently stored in an associated cache memory. The memory cache controller may process, or execute, the memory transactions using resources that are included as part of a transaction pipeline in the memory cache controller.

As a number of memory transactions being processed in the memory system increases, resources in the transaction pipeline that are used for locating, reading, and writing cached versions of requested data become busy. As a result, the memory cache controller stores, in a resource retry queue, memory transactions that are waiting for particular resources to become available. As these resources become available, a given memory transaction may be retried and eventually processed. The resource retry queue may attempt to retry queued commands as resources become available, selecting a particular memory transaction for a retry operation based on one or more criteria, such as, for example, an age of the transactions, priorities of the transactions, and the like. Some memory transactions may be dependent on execution of an earlier received memory transaction. For example, if the earlier memory transaction modifies a value of data stored in a memory location that a later memory transaction reads, then the later memory transaction is blocked by the earlier memory transaction and may not be retried until the blocking memory transaction has been processed.

While the computer system in operating, various cache memories may store a variety of data from multiple locations in the system memory. Some of this cached data may be used frequently, while other cached data may not be used for an extended period of time. Since cache memory is small compared to the system memory, performance of the computer system may increase when the cache stores frequently used data and may decrease if cache memories become filled with infrequently used data. Memory cache controllers may monitor data stored in cache memories and invalidate or evict cached data that is not used frequently. To perform such operations, a memory cache controller may issue a particular type of memory transaction, referred to herein as a cache management transaction.

Various types of memory transactions may be received and processed by a memory cache controller. Some memory transactions, such as some variations of read and write transactions issued by various agents may include a victim address indicating a location in cache, such as a cache line, that will be modified as a result of the execution of the transaction.

Other types of memory transactions, such as, for example, cache management transactions, may not include a victim address even if values in one or more memory locations will be modified. One example of a cache management transaction is a cache flush. A "cache flush transaction," or simply a "flush," causes an eviction of data or other information currently stored in a cache memory. A cache flush transaction, in various embodiments, may be applied to a cache line, a cache way, or an entire cache memory. Cache management transactions may result in additional processing by the memory cache controller to identify other transactions that block a cache management transaction or which may be block by it.

Embodiments of systems and methods for managing a retry queue are disclosed herein. The disclosed embodiments demonstrate methods for determining if a cache management transaction is blocked by other, previously received memory transactions, and indicating a link to blocking transactions to avoid executing the cache management transaction out of order. Such determinations may help to avoid other memory transactions from accessing invalid data, possibly reducing system performance due to an unexpected cache flush, or even a system failure.

Figure 1:
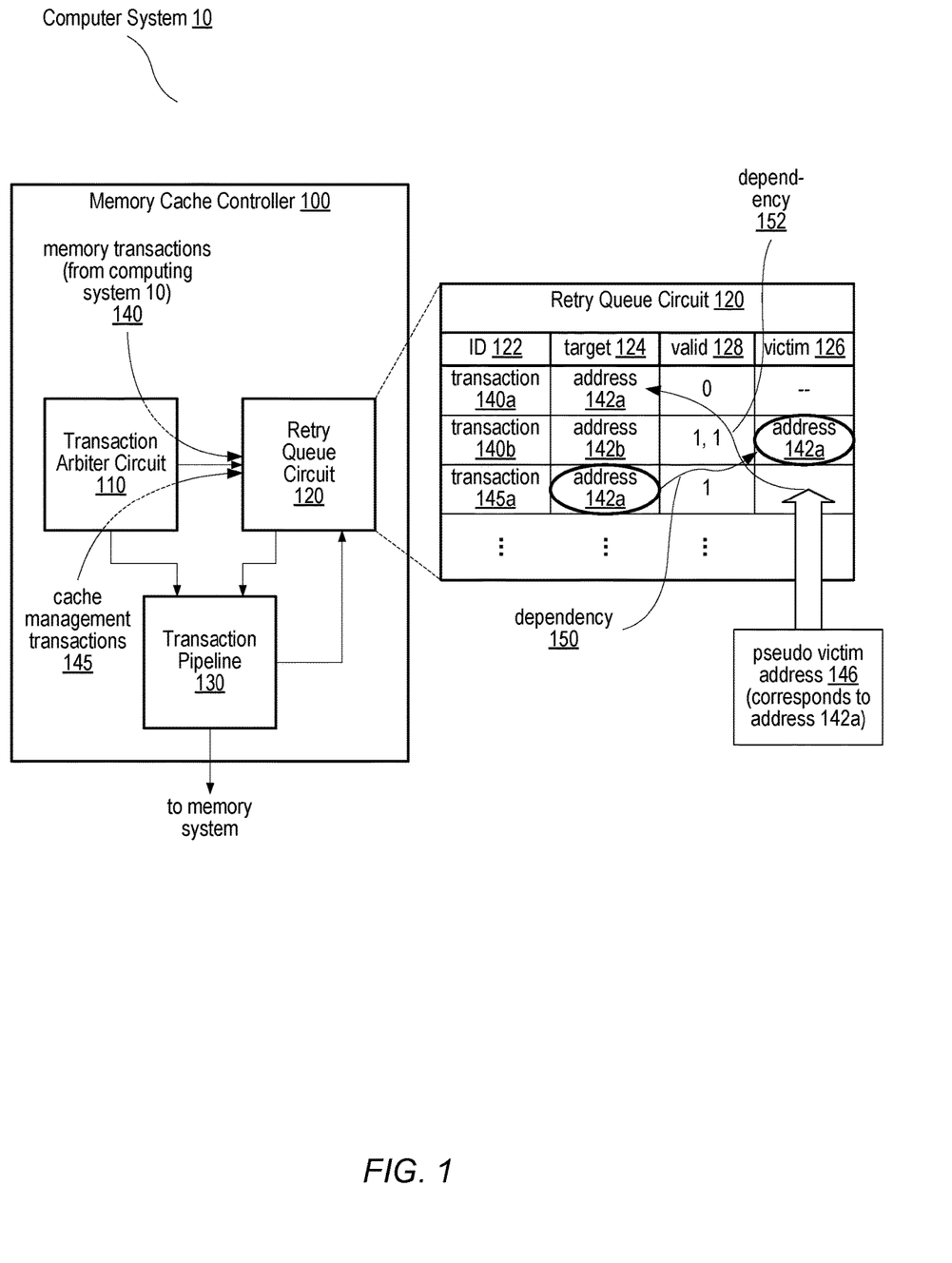
FIG. 1 illustrates a block diagram of an embodiment of a computer system that includes a memory cache controller.

A block diagram for an embodiment of a cache controller circuit is illustrated in FIG. 1. Memory cache controller 100, as illustrated, is included in a computer system 10 such as, for example, a system-on-chip (SoC), and may receive memory transactions issued by multiple agents, such as various processing circuits in the computer system. Memory cache controller 300 is included as a part of a memory system within the computer system and may interact with other parts of the memory system to fulfill a particular memory transaction. In the illustrated embodiment, memory cache controller 100 includes transaction arbiter circuit 110 coupled to retry queue circuit 120 and to transaction pipeline 130. Transaction pipeline 105 is further coupled to other portions of the memory system. Transaction arbiter circuit 110 receives memory transactions 140 and cache management transactions 145. A subset of memory transactions 140 and cache management transactions 145 may be stored in retry queue circuit 120. A detail of retry circuit 120 shows three queued memory transactions, 140a, 140b, and 145a.

As illustrated, transaction arbiter circuit 110 is a circuit that receives memory transactions 140 and cache management transactions 145, and determines if each of the received transactions 140 and 145 can currently be processed by memory transaction pipeline 130. Transaction arbiter circuit 110 may include one or more state machines, sequential logic circuits, or other type of processing circuits to retrieve and evaluate a memory transaction and determine if the transaction is ready to be sent to transaction pipeline 130 for processing. Memory transactions include a variety of transaction types. For example, transaction arbiter circuit 110 may receive memory transactions 140 from one or more agents, including transactions to read, write, or modify data at one or more memory locations in a memory system. Transaction arbiter circuit 110 also receives cache management transactions 145, including requests to manage information stored in one or more cache memory circuits. "Cache management transactions" are a particular type of memory transaction issued by circuits within a memory cache controller for managing data stored in a particular cache memory and for accessing information about the cached data. Some examples of cache management transactions include transactions to read a cache tag of a particular cache line, flush a cache line, clear a data set identification value, and the like. Unlike other non-cache management memory transactions that may originate from sources outside of memory cache controller 100, cache management transactions originate from a cache control circuit within memory cache controller 100. While non-cache management memory transactions may include a victim address when applicable, cache management transactions do not include victim addresses, even when the execution of the cache management transaction results in modifying or otherwise invalidating information stored in the cache.

To determine if a particular one of memory transactions 140 can currently be processed, transaction arbiter 110 determines if resources in transaction pipeline 130 that are to be used by the particular memory transaction are available. In addition, transaction arbiter 110 may determine if a different memory transaction that is ahead of the particular memory transaction blocks the particular memory transaction. If the particular memory transaction modifies data at a target address while the different memory transaction reads data from the same target address, then the different memory transaction blocks the particular memory transaction. Conversely, if the particular memory transaction reads data from the target address while the different memory transaction modifies data at the same target address, then the different memory transaction again blocks the particular memory transaction.

If transaction arbiter 110 determines that the particular memory transaction can currently be processed, then the particular memory transaction is sent to transaction pipeline 130 to be executed. Transaction pipeline 130 may include various circuits, such as state machines, sequential logic circuits, registers, and the like, used to execute a memory transaction. Transaction pipeline 130 may include one or more stages, including stages to fetch, decode, execute, and retire a received transaction. As used herein, the concept of transaction "execution" refers to processing of a transaction throughout the transaction pipeline. Execution of a memory transaction may vary depending on the type of transaction and depending on where in a memory system the requested information associated with the memory transaction is stored. Decoding of a memory transaction may include generating one or more memory commands that are executed as part of performing the memory transaction. For example, writing to a memory location that is currently stored in one or more cache memories as well as a system memory may generate several write commands to update the information stored in each one of the cache and system memories.

In response to a determination that the transaction pipeline is unable to process a cache memory transaction, then transaction arbiter circuit 110 may place the transaction into retry queue circuit 120. Retry queue circuit 120, as shown, is a circuit that includes storage, such as, e.g., a plurality of registers or a small static random-access memory (SRAM) array, for storing information related to one or more memory transactions that are temporarily unable to proceed with processing. "Placing" or "storing" a transaction into retry queue circuit 120 corresponds to creating an entry in retry queue circuit 120 corresponding to the transaction. In some embodiments, an entry in retry queue circuit 120 includes several fields, such as a value representing a memory transaction (ID 122) and a target address or addresses for the command (target 124). Entries may also include a victim address field (victim 126) indicative of one or more memory locations whose values may be modified as a result of execution of the transaction. Furthermore, entries may include one or more valid bits (valid 128) to indicate if execution of the corresponding transaction is dependent on other transactions acting on the included target or victim address. An entry may also include any other suitable values that may be used in the processing of the transaction, such as, for example one or more values indicating a priority, an age, or other like values associated with the respective transaction.

Retry queue circuit 120, in the illustrated embodiment, includes three transactions, memory transactions 140a and 140b, as well as cache management transaction 145a. These three transactions have been received in the order 140a, 140b, and then 145a. Transaction 140a includes a target address 124 of address 142a, and a valid bit 128 with a value of '0' indicating that transaction 140a is not dependent on other transactions acting on address 142a. Transaction 140a does not include a victim address 126. Transaction 140b includes a target address 124 of address 142b and a victim address 126 of address 142a. In addition, transaction 140b includes two valid bits 128, both set to '1' indicating that transaction 140b is dependent on other transactions acting on both target address 142b and victim address 142a. Transaction 145a includes a target address 124 of address 142a with a valid bit 128 of 1 indicating a dependency on other transactions acting on address 142a. Transaction 145a does not initially include a victim address 126. As shown, transactions 140a and 140b correspond to memory transactions other than cache management transactions, while transaction 145a is a cache management transaction. Since the target address 124 for transaction 145a (address 142a) matches the victim address 126 of transaction 140b and the valid bit 128 is set, transaction 140b blocks transaction 145a. In response, retry queue circuit 120 acknowledges dependency 150 from transaction 145a to transaction 140b. Based on dependency 150, retry queue circuit 120 waits to initiate a retry of transaction 145a until transaction 140b has been executed.

Although transaction 145a does not include a victim address 126, transaction 145a is a cache management transaction that has a target address 124 of address 142a, same as transaction 140a. Retry queue circuit 120 determines that both the previously stored transaction 140a and the cache management transaction 145a have a common target address 126 of address 142a, and that transaction 145a has a valid bit 128 of 1, indicating a dependency on other transactions acting on address 142a. Accordingly, retry queue circuit 120 determines that transaction 140a blocks transaction 145a. In response, retry queue circuit 120 generates pseudo victim address 146 that corresponds to address 142a, and stores pseudo victim address 146 in the victim address field 126 for transaction 145a. By storing pseudo victim address 146 in the victim address field 126 retry queue circuit 120 establishes dependency 152 from transaction 145a to transaction 140a. Dependency 152, similar to dependency 150, causes retry queue circuit 120 to wait to initiate a retry of transaction 145a until transaction 140a has been executed.

In addition to waiting to retry transaction 145a until transaction 140b has been processed, retry queue circuit 120 may postpone retries of transactions that arrive after transaction 140b that have address 142a as a target address. Neither transaction 140a nor transaction 145a has a victim address 126. Due to the lack of an indicated victim address 126 in these two transactions, retry queue circuit 120 generates a dependency by using the blank victim address field for transaction 145a to store pseudo victim address 146. This creates dependency 152 from transaction 145a to transaction 140a. In other embodiments, values other than address 142a may be stored in the victim address field 126 or in other unused fields in a respective retry queue entry. Some embodiments may utilize various types of flags or other identifying data bits. For example, in some embodiments, retry queue circuit 120 may also add a second valid bit 128 to transaction 145a to indicate dependency 152 based on pseudo victim address 146.

As illustrated, retry queue circuit 120 initiates a retry in transaction pipeline 130, of transactions 140a, 140b, and 145a that are currently stored in retry queue circuit 120. As used herein, a "retry" indicates when a retry queue circuit resends a particular memory transaction currently in queue for processing in the transaction pipeline. If the transaction pipeline cannot process the retried transaction, then this transaction is sent back to the retry queue circuit to be retried again at a later time. Retry queue circuit 120 may use one or more criterion for selecting a particular one of the queued memory transactions for a given retry attempt, such as, for example, an age of the transaction, a priority of the transaction, a known availability of resources to be used by the transaction, and the like. In addition, retry queue circuit 120 selects a memory transaction to retry in transaction pipeline 130 based on dependencies 150 and 152. Dependencies 150 and 152 cause retry queue circuit 120 to postpone initiating retry attempts of transaction 145a until both transaction 140a and transaction 140b have been processed. For example, in some embodiments, circuits in retry queue circuit 120 compare addresses in the target address field 124 to addresses in the victim address field 126 to identify potential blocking transactions based on matching or overlapping addresses. An overlapping address may occur when one or more memory locations indicated by a particular address value are included within a range of locations indicated by a different address. Retry queue circuit 120 may then determine if a dependency exists based on the respective types of transactions identified, the relative ages of the identified transactions, or other criteria.

Establishing a dependency, through use of a pseudo victim address, between a cache management transaction and blocking memory transaction without a victim address, a retry queue circuit may be capable of properly ordering retry attempts of the two transactions. The use of the pseudo victim address to establish the dependency may allow the retry queue circuit to reuse existing circuitry for performing retries of the queued transactions, thereby saving circuit area and reducing costs, and potentially reducing power consumption.

It is noted that Memory Cache Controller 100 as illustrated in FIG. 1 is merely an example. The illustration of FIG. 1 has been simplified to highlight features relevant to this disclosure. Various embodiments may include different configurations of the circuit blocks, including additional circuit blocks, such as, for example, a management circuit. Although three transactions are shown in the retry queue circuit, any suitable number of transactions may be queued at a given time.

Figure 2:
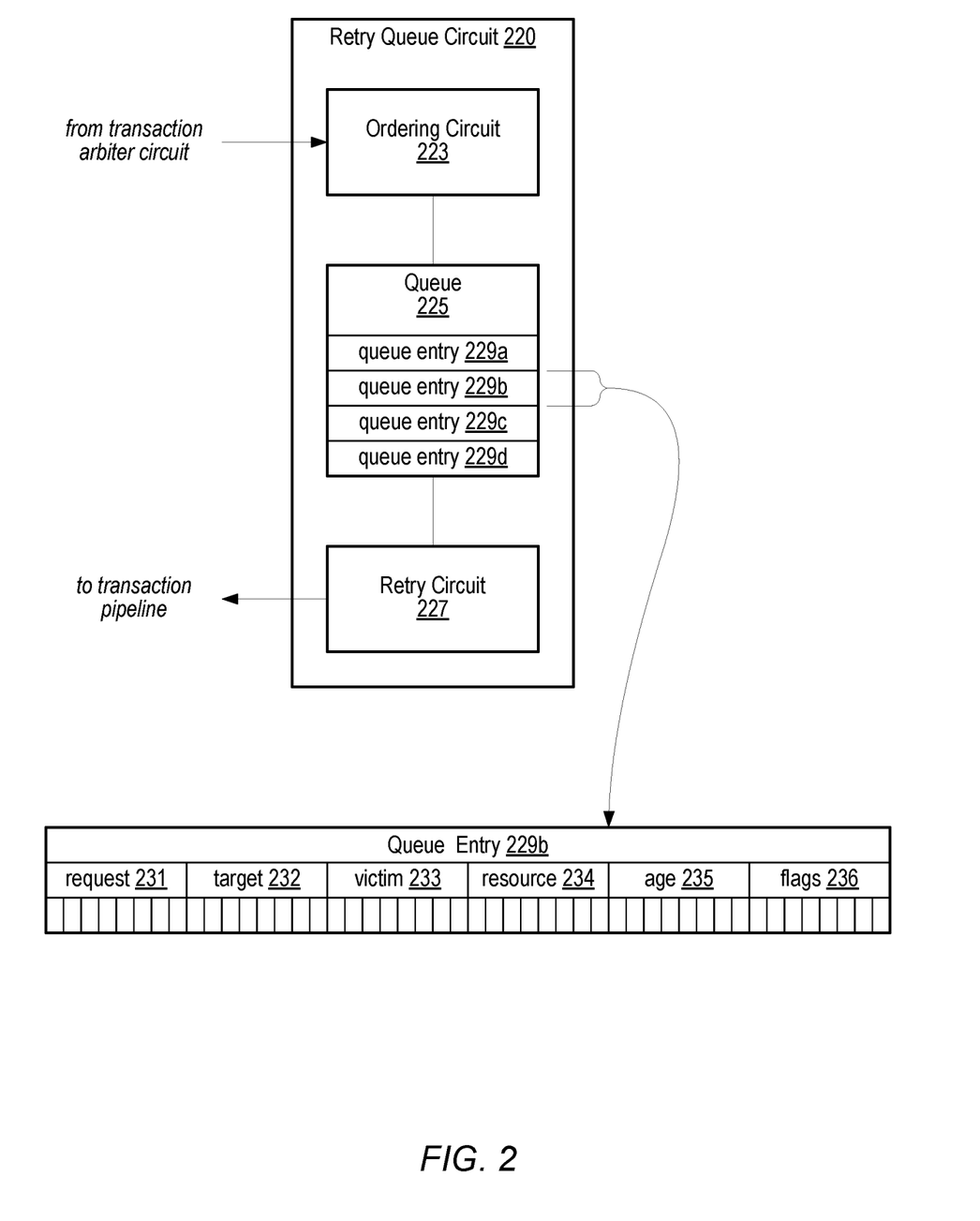
FIG. 2 shows a block diagram of an embodiment of a retry queue circuit from a memory cache controller.

Further details of a retry queue circuit are provided in FIG. 2. Retry queue circuit 220, as illustrated, corresponds to one embodiment of retry circuit 220. Retry queue circuit 220 includes ordering circuit 223, queue 225, and retry circuit 227. Queue 225 is shown with four entries, queue entries 229a-229d (collectively referred to as queue entries 229), although any suitable number of entries may be included in various embodiments. An example of queue entry 229b is shown in detail.

Ordering circuit 223 includes circuits used to receive memory transactions from a transaction arbiter, such as transaction arbiter 110 in FIG. 1. As described above, the received memory transactions may come from memory transactions 140 and/or cache management transactions 145. After receiving a particular memory transaction, ordering circuit 223 places the received memory transaction in an entry in queue 225. Ordering circuit may use any suitable criteria for ordering the received memory transaction, such as by an age of the transaction, a priority of the transaction, and the like. In various embodiments, transactions stored in queue 225 may be ordered based on their position in queue 225, or by using a bit field included in each queue entry 229, for example, one or more bits of the field, flags 236.

If the received memory transaction corresponds to one of cache management transactions 145, then ordering circuit 223 may also determine if one or more memory transactions previously stored in queue 225 blocks the received cache management transaction. Ordering circuit 223 may, in some embodiments, determine that the cache management transaction is blocked by a previously stored memory transaction by determining that the previously stored memory transaction and the cache management transaction target a common address. It is noted that various memory transactions may target a range of addresses rather than a single memory address. For example, a cache management transaction may target an entire cache line, including multiple memory addresses. Therefore, ordering circuit 223 may not detect an exact match between two addresses, but instead detect an overlap or intersection of two target address ranges. If ordering circuit 223 determines that the received cache management transaction is blocked by a previously received memory transaction, then ordering circuit 223 generates and stores a pseudo victim address in the victim address field 233 of a queue entry 229 allocated to the received cache management transaction.

Queue 225 includes storage circuitry for storing received memory transactions until they can be retried and processed. Queue 225 may include, for example, an SRAM array, a register file, or other type of readable and writable storage circuit. The storage circuitry, as shown, is organized into a plurality of queue entries 229, each entry 229 capable of storing one memory transaction. Each entry includes a plurality of bit fields, such as request 231, target address 232, victim address 233, resource 234, age 235, and flags 236. Although each field is shown as including eight data bits, any suitable number of data bits may be used for each field, and the number of data bits per each respective field may differ.

Request field 231 holds a value indicative of the type of the corresponding memory transaction, for example, a read, a write, or a particular cache management transaction such as a cache line flush. Target address field 232 holds an indication of a memory location or range of locations to which the memory transaction will be applied. Victim address field 233 includes an indication of a memory location in which the stored data may be modified. Victim address field 233 may indicate one or more cache lines, and in various embodiments, may be identified by a physical address of the corresponding cache lines, by an address of data stored in the cache lines, or by a combination of thereof. Resource field 234 includes an indication of one or more resources to be used by the memory transaction and, therefore, that the memory transaction is waiting on before it can be processed. Age field 235 stores an indication of an age of the corresponding memory transaction. The age may be stored as a time stamp or other count value corresponding to when the memory transaction was issued by a corresponding agent, when the transaction was received by the memory cache controller, or another like event related to the memory transaction. In some embodiments, the age field 235 may include multiple time stamps. Flags field 236 includes various flags associated with the corresponding memory transaction. For example, flags field 236 may include flags or combinations of flags which indicate a priority of the corresponding memory transaction, one or more flags which indicate a particular agent that issued the memory transaction, and other like flags that provide information regarding the corresponding memory transaction.

Retry circuit 227 includes circuitry (such as state machines, sequential logic circuits, and the like) for selecting a memory transaction from one of queue entries 229 to retry in a transaction pipeline, such as transaction pipeline 130. Retry circuit 227 may utilize any suitable criterion for selecting a queued memory transaction for a retry operation. Retry circuit 227 may select an oldest or a highest priority transaction. In some embodiments, retry circuit 227 may use resource field 234 to select a transaction that uses a large or small number of resources depending on a number of queued transactions. For example, if queue 225 is storing few transactions, then retry circuit 227 may select a queued memory transaction that uses a large number of resources. Retry circuit 227 may also determine how recently memory transactions were retried and select transactions that have not been retried recently.

As part of the selection process, retry circuit 227 may determine if a particular memory transaction is blocked before selecting it. To determine if the particular transaction is blocked, retry circuit 227 compares target address 232 of the particular memory transaction to victim addresses 233 of older queued memory transactions. Retry circuit 227 may also compare victim address 233 of the particular memory transaction to target addresses 232 of older queued memory transactions. If addresses correspond in the comparison (e.g., if there is at least one common address associated with the compared address fields) then retry circuit may consider the particular memory transaction as blocked and therefore, not select the particular memory transaction at the current time. Once a memory transaction is selected, then retry circuit 227 sends the selected transaction to the transaction pipeline. If the transaction pipeline determines that the resources needed to process the selected transaction, processing continues and queue entry 229 corresponding to the selected transaction is deallocated and made available for a next memory transaction. Otherwise, the selected transaction remains in queue 225.

It is noted that by adding a pseudo victim address in a victim address field 233 of a queue entry 229 allocated to a blocked cache management transaction, retry circuit 227 may be capable of detecting a dependency of the cache management transaction on a previously received memory transaction. In addition, the use of the victim address field to establish this dependency may require little or no additional circuitry in the retry circuit 227. Instead, circuitry may be added to the ordering circuit to detect and establish the dependency and to generate and store the victim address value in the victim address field 233. In some embodiments, limiting circuit changes to the ordering circuit may simplify the changes, and may result in a smaller increase in circuitry compared to changing a design of the retry circuit.

It is noted that the retry queue circuit of FIG. 2 is an example used to describe the disclosed concepts. Some embodiments may include different configurations of the circuit blocks. Additional circuit elements, such as clock signals and power supply signals, are omitted for clarity. Although four queue entries are illustrated, any suitable number of entries may be included.

As disclosed above, memory transactions may be issued from various agents in a computer system. For example, memory transactions may be issued by processors, processor cores, graphics processors, and the like. In addition, cache management transaction, such as those described above, may be issued by a management circuit within a memory cache controller included in the computer system.

Figure 3:
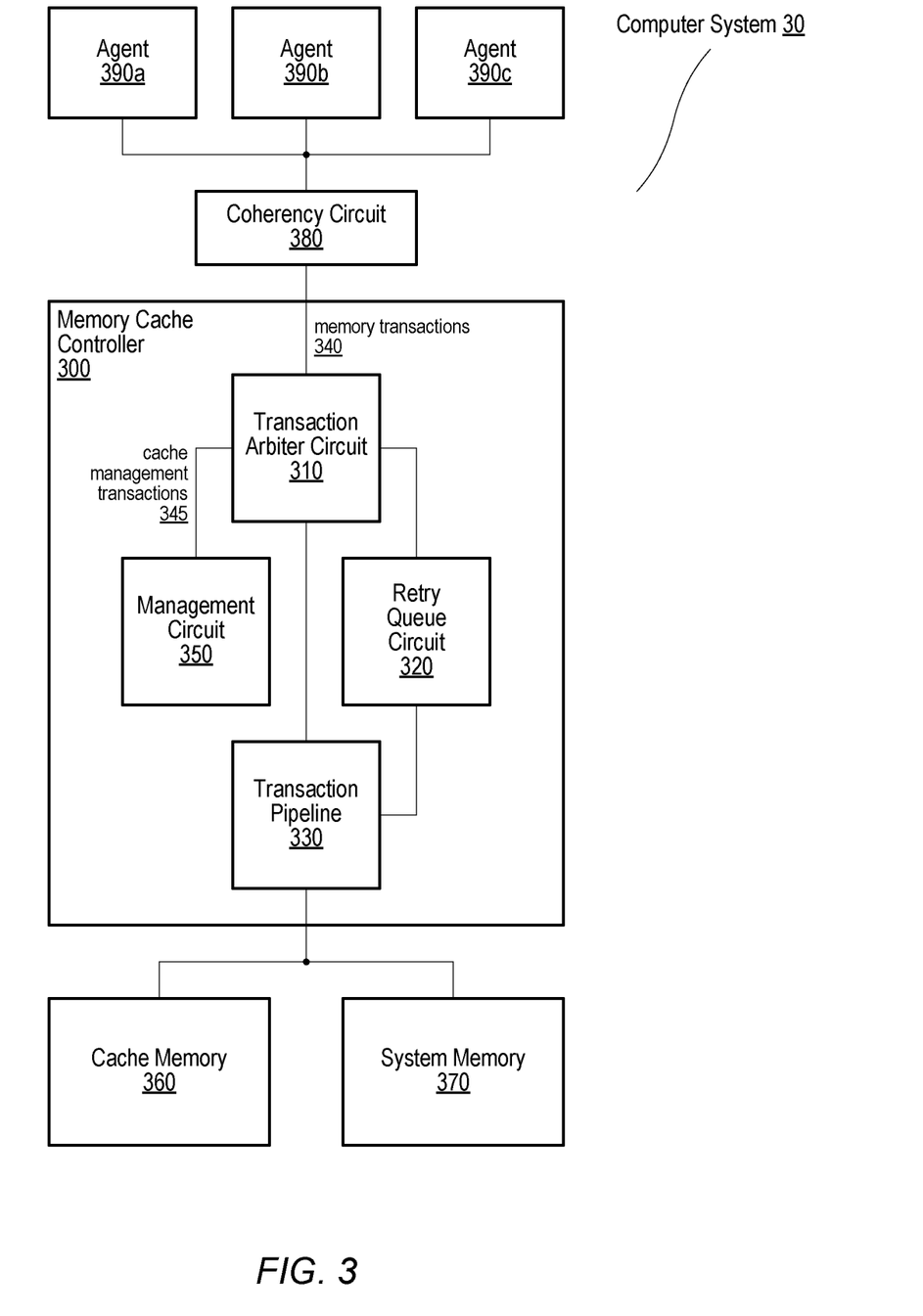
FIG. 3 depicts a block diagram of an embodiment of a computer system.

An embodiment of a computer system that includes various agents that can issue memory transactions is illustrated in FIG. 3. Computer system 30 includes memory cache controller 300, coupled to cache memory 360 and system memory 370, as well as to coherency circuit 380. Coherency circuit 380 is coupled to various agents 390a-390c, collectively referred to as agents 390. In some embodiments, computer system 30 corresponds to computer system 10 in FIG. 1. Descriptions of the circuit blocks in computer system 10 apply to the similarly named and numbered circuit blocks of FIG. 3, and therefore will not be repeated below. Additional descriptions of these circuit blocks below, however, may be applied, in some embodiments, to computer system 10.

As shown, agents 390 may correspond to any suitable type of processing circuit. For example, agents 390 may include one or more processing cores, graphics processing units, network processors, audio processors, security processors, and the like. Each of agents 390 may issue memory requests to read information from and write data to system memory 370 based on address values included in the memory transactions. Based on the address values, at least a portion of these memory transactions, memory transactions 340, are sent to memory cache controller 300. In some cases, data corresponding to an address value in a particular one of memory transactions 340 may be cached in cache memory 360, and the corresponding transaction is fulfilled using this cached data. In other cases, the data corresponding to the address value may not be cached, and instead be fulfilled using system memory 370. Some of memory transactions 340 may result in both cache memory 360 and system memory 370 being accessed. For example, a particular memory transaction 340 may write data to an address that is cached in cache memory 360, both the location in cache memory 360 and the corresponding location in system memory 370 are updated with a new value as specified by the memory transaction 340.

When agents 390 issue memory transactions 340, these transactions pass through coherency circuit 380. Coherency circuit 380, as depicted, includes circuits for receiving memory transactions 340 and, based on address values included in memory transactions 340, determine any cache memory locations in computer system 30 where data corresponding to a given address value is cached. In some embodiments, cache memory 360 is not the only cache memory. For example, in some embodiments, one or more of agents 390 may include a local cache memory, such as instruction and data caches coupled to a processing core. In addition, some embodiments may include multiple instantiations of memory cache controller 300 and cache memory 360. Coherency circuit 380 manages coherency across all of the cache memories and system memory 370. Coherency circuit 380 may support any suitable coherency protocol, such as modified-owned-shared-invalid (MOSI), modified-owned-exclusive-shared-invalid (MOESI), modified-exclusive-read only-shared-invalid MERSI, and the like. If a data value cached in a local cache in agent 390a, for example, is modified, then coherency circuit 380 may receive a notification from agent 390a of the change. If coherency circuit 380 determines that cache memory 360 also stores a cached version of the same memory location, then coherency circuit 380 generates a memory transaction 340 for memory cache controller 300 to update or evict the cached version stored in cache memory 360. In some cases, coherency circuit 380 adds a victim address to a particular memory transaction 340 to indicate to memory cache controller 300 that data currently cached in cache memory 360 may be modified by the particular memory transaction.

Memory cache controller 300, as described above for memory cache controller 100, receives and processes memory transactions 340. Memory cache controller 300 includes transaction arbiter circuit 310, retry queue circuit 320, and transaction pipeline 330, each of which operate as described above in FIG. 1. In addition, memory cache controller 300 includes management circuit 350. Management circuit 350, as illustrated, issues cache management transactions 345 to transaction arbiter circuit 310 to manage operation of cache memory 360. Cache management transactions 345 issued by management circuit 350 may include requests to flush one or more cache lines in cache memory 360, or to clear a dataset identification associated with cached data. As computer system 30 is in operation, cache memory 360 may become filled with cached data. Once cache memory 360 becomes full or near full, management circuit 350 may make decisions regarding keeping some or all of the cached data, or to evict some or all of the cache lines to free storage space for new data. For example, management circuit 350 may determine that a portion of the cached data has not been accessed by any of agents 390 for an extended amount of time. Based on this information, management circuit 350 may issue cache management transactions 345 to flush cache lines where the cached data is stored.

Cache management transactions 345 do not go through coherency circuit 380. As a result, cache management transactions 345 do not include victim addresses. As presented above, retry queue circuit 320 uses victim addresses to determine dependencies between queued transactions. Retry queue circuit 320, however, is capable of determining dependencies between cache management transactions 345 and any queued memory transactions 340, and assigning a pseudo victim address if appropriate. Retry queue circuit 320 is, therefore capable of ordering and retrying cache management transactions 345 as described above.

It is noted that FIG. 3 is merely an example. Various embodiments may include different configurations of the circuit blocks, including a different number of agents. Additional circuit elements, are omitted for clarity. For example, in other embodiments, additional memory cache controllers and/or cache memories may be included.

Figure 4:
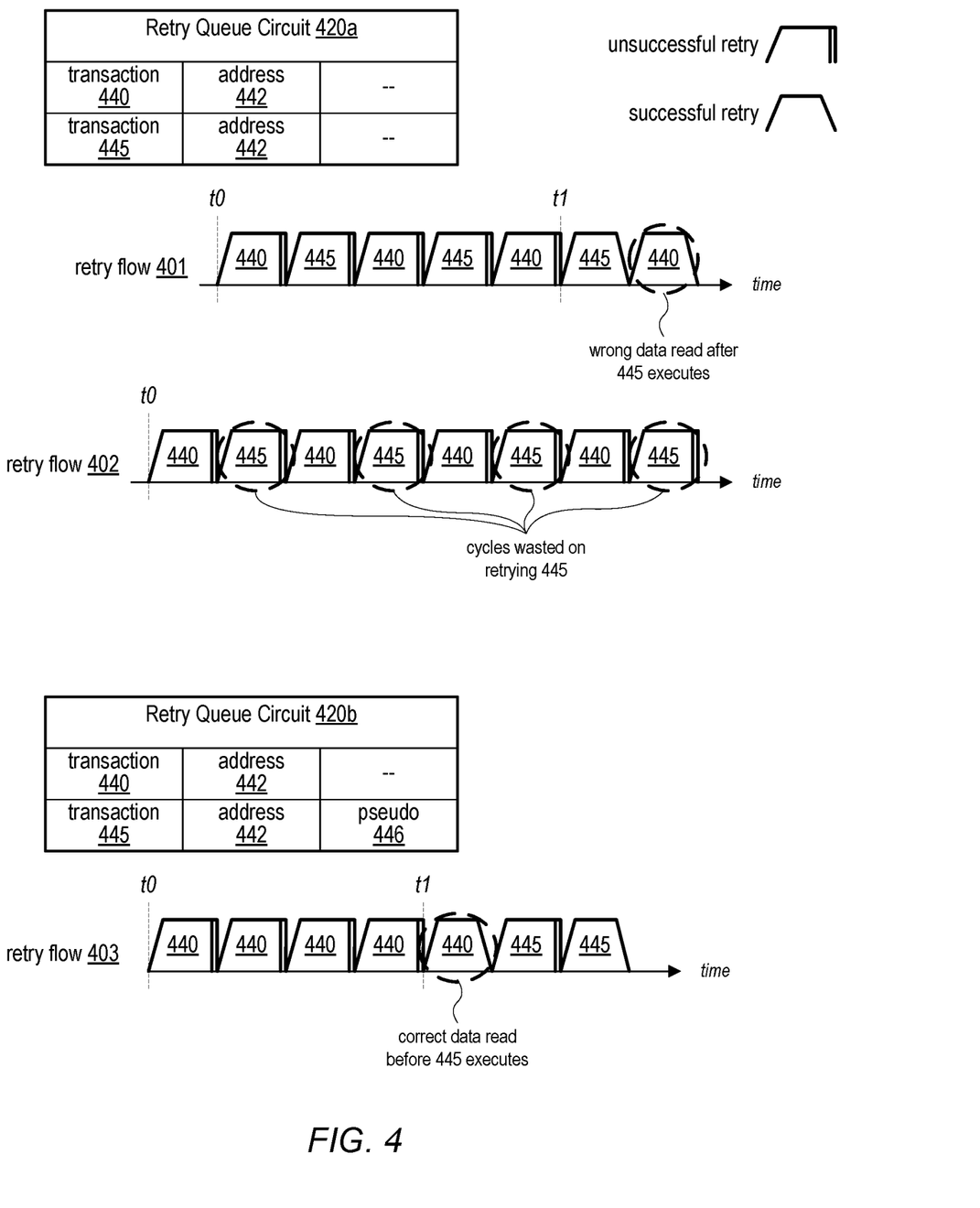
FIG. 4 presents three timelines of memory transactions being retried by a retry queue circuit.

Turning to FIG. 4, several timelines are presented to illustrate a flow of memory transactions through a retry queue circuit. FIG. 4 includes three timelines, retry flows 401, 402, and 403. Retry flows 401 and 402 illustrate examples of an order of transaction retries in retry queue circuit 420a. Vertical double bars shown at the end of a transaction retry attempt indicate that the retry attempt was unsuccessful. A single slanted line at the end of a retry attempt indicates that the attempt was successful, and the transaction is accepted into a transaction pipeline. Retry queue circuit 420a does not store a pseudo victim address for a cache management transaction. Retry flow 403 depicts an example of an order of transaction retries in retry queue circuit 420b. Retry queue circuit 420a does not store a pseudo victim address for a cache management transaction. Retry circuit 420b, as illustrated, may correspond to anyone of the retry queue circuits disclosed herein, such as retry queue circuit 120, 220, or 320.

Retry queue circuit 420a is shown with two transactions. Transaction 445 is a cache management transaction that targets address 442 while transaction 440 is a read memory transaction from a requesting agent that also targets address 442. Transaction 445 may include a flush command, a dataset identification clear command, or other type of command that modifies information corresponding to a cache line that stores data corresponding to address 442. Retry queue circuit 420a attempts retries for the queued transactions 440 and 445 by selecting one of the two transactions for a retry operation and sending the selected transaction to a transaction pipeline, such as transaction pipeline 330.

In retry flow 401, at time $t_0$, retry queue circuit 420a alternatively sends transaction 440 and then transaction 445, both unable to be processed due to, for example, unavailable resources. At time $t_1$, transaction 445, the cache management transaction, is able to process and is accepted into transaction pipeline 330. Transaction 440 follows and is able to be processed after transaction 445. Since execution of transaction 445 preceded transaction 440 and transaction 445 modifies information associated with address 442, transaction 440 may result in wrong data being read and returned to the requesting agent. In some cases, this wrong data may cause a minor error to the requesting agent if the data is not critical, such as one of many data values in a media stream. In other cases, the wrong data may cause a catastrophic error to the requesting agent if, for example, the data corresponds to an instruction to be executed by the requesting agent, resulting in a random instruction being executed rather than the expected instruction.

In retry flow 402, starting at time $t_0$, retry queue circuit 420a again alternatively sends transaction 440 and then transaction 445, both unable to be processed. In the example of retry flow 402, however, transaction pipeline 330 is capable of determining that transaction 445 should not proceed before transaction 440. Transaction pipeline 330 returns transaction 445 back to retry queue circuit 420a even if resources are available to process the transaction. Retry attempts, however, are expended by retry queue circuit 420a attempting to retry transaction 445 rather than another transaction that may be able to proceed when resources are available.

Retry queue circuit 420b is shown with the same two transactions as retry queue circuit 420a. Retry queue circuit 420b, however, detects the dependency of the cache management transaction 445 on the read memory transaction 440, and determines that transaction 440 may read erroneous data if processed after transaction 445. As described above, retry queue circuit 420b generates pseudo victim address 446, corresponding to address 442, and stores pseudo victim address 446 in a victim address field of the queue entry corresponding to transaction 445. As shown by retry flow 403, retry queue 420b, at time $t_0$, repeatedly retries transaction 440. Retry queue circuit 420b knows, based on pseudo victim address 446, that transaction 445 is dependent on the execution of transaction 440, and, therefore, does not select transaction 445 while transaction 440 remains queued. At time $t_1$, transaction 440 is able to be processed, after which transaction 445 is now able to be retried.

By generating and using the pseudo victim address, the retry queue circuit is able to select a transaction for retry in a suitable order that detects dependencies and avoids retrying transactions in an order that may result in wasted cycles of the retry queue circuit and the transaction pipeline. In some embodiments, use of the pseudo victim address may help to avoid a critical processing error. Critical processing errors may result in a cache flush operation, or in more extreme cases, a complete reset of some or all of the circuits of the computer system. Since such errors are reduced, the amount of processing per unit time is not reduced as much, thereby allowing the computer system to maintain a high level of performance. Use of the pseudo victim address may, therefore, increase performance of the computer system.

It is noted that the embodiment of FIG. 4 is merely an example for demonstrating the disclosed concepts. The relative timing depicted by the timelines for retry flows 401, 402, and 403 is scaled for clarity. In other embodiments, the time scale and timing for each retry operation may differ. For example, the time durations for successful retry attempts may differ from unsuccessful attempts.

Figure 5:
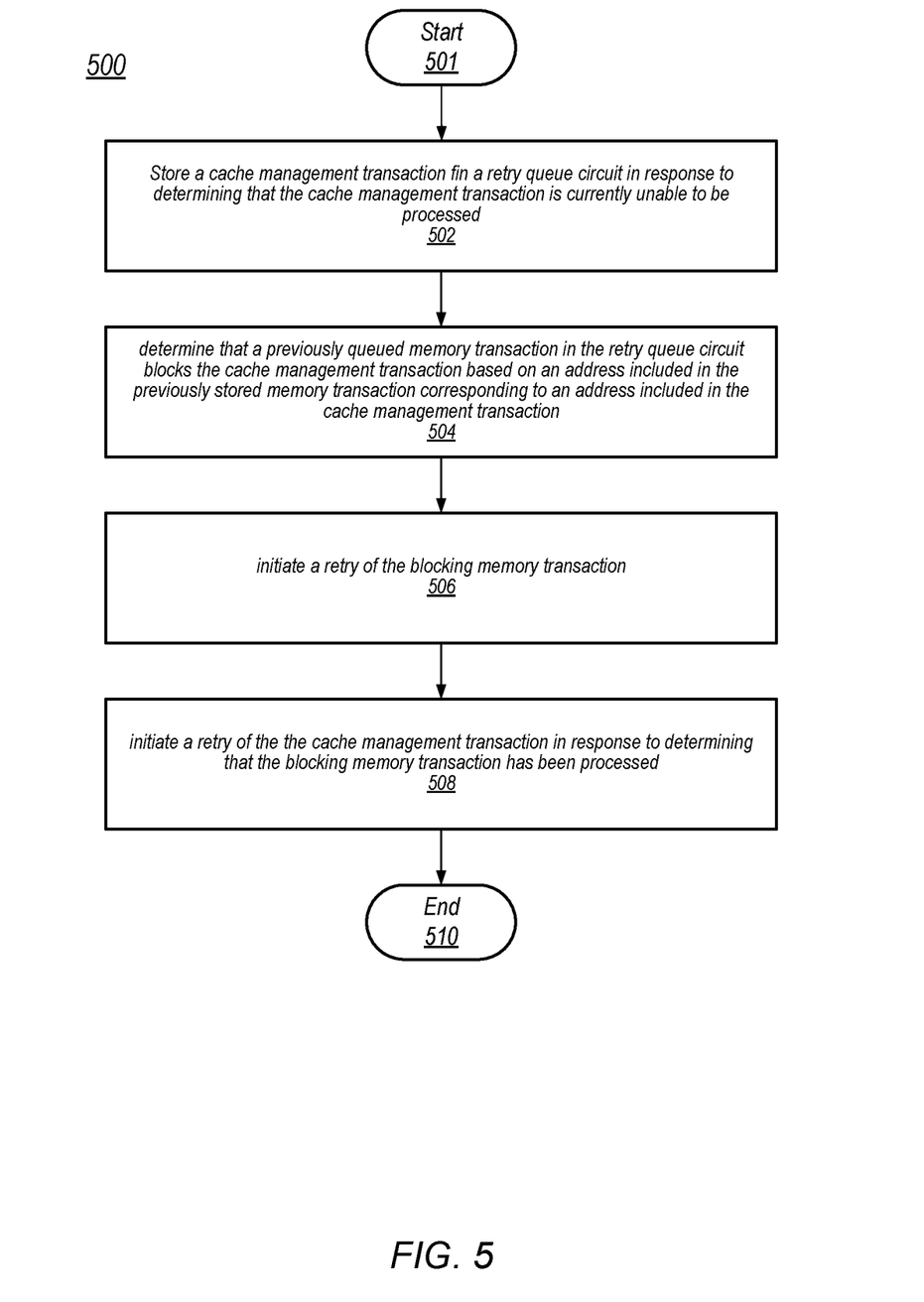
FIG. 5 illustrates a flow diagram of an embodiment of a method for operating a memory cache controller.

Proceeding to FIG. 5, a flow diagram illustrating an embodiment of a method for operating a memory cache controller is shown. Method 500 may be applied to any of the previously disclosed memory cache controller circuits, such as memory cache controllers 100 in FIG. 1 or 300 in FIG. 3. Referring collectively to memory cache controller 100 and the flow diagram in FIG. 5, method 500 begins in block 501.

The method includes storing, by an arbitration circuit, a cache management transaction in a retry queue circuit in response to determining that the cache management transaction is currently unable to be processed (block 502). Referring to FIG. 1, for example, transaction arbiter circuit 110 stores cache management transaction 145a in retry queue circuit 120. Transaction 145a includes a target address 142a and may also include a flush command or a dataset identification clear command to be executed on a cache line corresponding to address 142a.

The method further includes determining that a previously queued memory transaction in the retry queue circuit blocks the cache management transaction based on an address included in the previously stored memory transaction corresponding to an address included in the cache management transaction (block 504). For example, retry queue circuit 120 includes previously stored memory transactions 140a and 140b. Retry queue circuit 120 determines that transaction 140a has a common target address as transaction 145a, address 142a. In some cases, the address values included in transactions 140a and 145a may not be an exact match. One or both address values may indicate a range of memory locations. The address values for each of these transactions may indicate an overlap of at least one of the memory locations. Retry queue circuit 120 establishes a dependency from the cache management transaction 145a to the blocking memory transaction 140a. This dependency may be established by assigning victim address 146 to transaction 145a.

The method also includes initiating a retry, by the retry queue circuit, of the blocking memory transaction (block 506). Retry queue circuit 120, for example, selects transaction 140a based on any suitable criteria disclosed above. The selected transaction 140a is sent to transaction pipeline 130 to be retried. If resources within transaction pipeline 130 are available to process transaction 140a, transaction pipeline 130 accepts transaction 140a and proceeds to execute the accepted transaction. Otherwise, if at least one resource is unavailable, transaction 140a remains in retry queue circuit 120 to be retried again at a later point in time.

In addition, the method includes initiating a retry, by the retry queue circuit, of the cache management transaction in response to determining that the blocking memory transaction has been processed (block 508). As an example, after transaction 140a has been accepted by transaction pipeline 130 and has been executed, transaction 145a may be selected and retried by retry queue circuit 120. In some cases, retry queue circuit 120 may determine that transaction 140b also blocks cache management transaction 145a based on an indication of a victim address included in memory transaction 140b corresponding to address 142a of transaction 145a. In such a case, retry queue circuit 120 may select transaction 145a for a retry attempt in response to determining that both memory transaction 140a and memory transaction 140b have been processed. The method ends in block 510.

It is noted that method 500 is one example related to operation of a memory cache controller. Some embodiments may include additional operations, such as, for example, generating a pseudo victim address to store in the entry for the cache management transaction.

Figure 6:
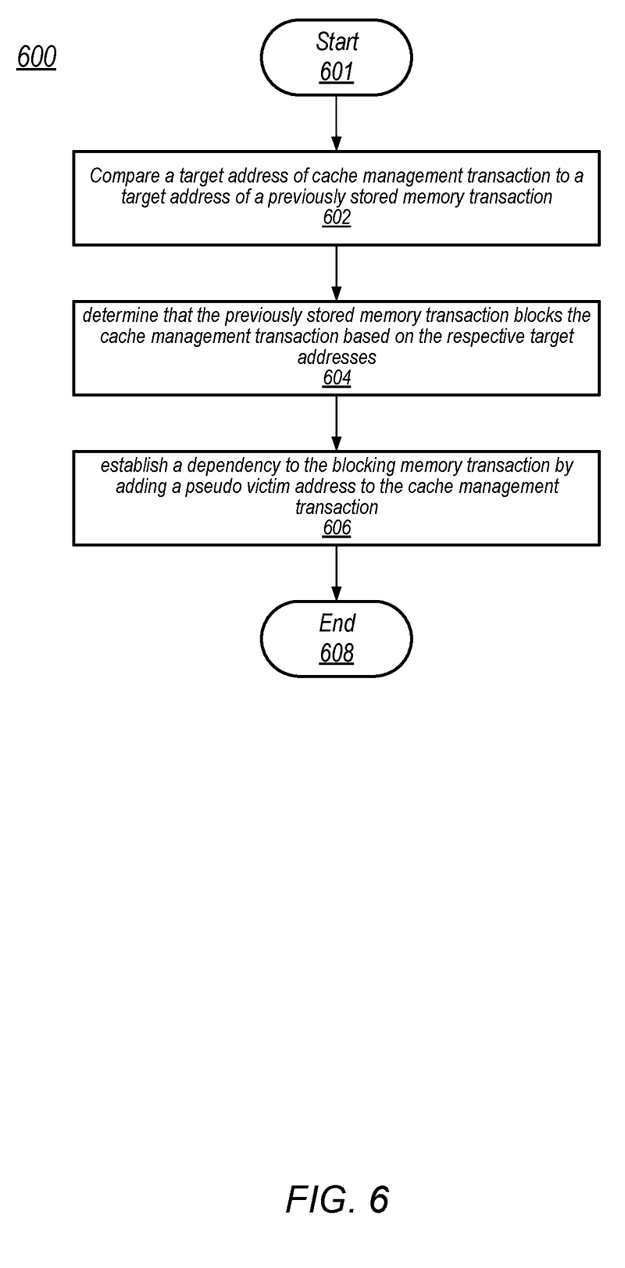
FIG. 6 shows a flow diagram of an embodiment of a method for operating a retry queue circuit.

Proceeding to FIG. 6, a flow diagram illustrating an embodiment of a method for operating a retry queue circuit is shown. Method 600, similar to method 500 above, may be applied to any disclosed retry queue circuit, such as retry queue circuits 120, 220, or 320 in FIG. 1, 2, or 3, respectively. The operations disclosed by method 600 may be performed, in some embodiments, in combination with or as a part of method 500, for example, as a part of block 504. Referring collectively to FIG. 1, and the flow diagram of FIG. 6, the method begins in block 601.

The method includes comparing, by a retry queue circuit, a target address of a cache management transaction to a target address of a previously stored memory transaction (block 602). Referring to FIG. 1 as an example, retry queue circuit 120 compares a target address 124 of cache management transaction 145a to a target address 124 of memory transaction 140a. Retry queue circuit 120 may, in some embodiments, initiate the address comparison in response to receiving transaction 145a from transaction arbiter circuit 110.

The method further includes determining, by the retry queue circuit, that the previously stored memory transaction blocks the cache management transaction based on the respective target addresses (block 604). For example, retry queue circuit 120 compares the values in the target address fields 124 for both transactions 140a and 145a. As shown in FIG. 1, both transactions have target address 142a. As has been noted, the two addresses may not be an exact match, but instead indicate an overlap of at least one memory location. If at least one memory location overlaps, then a dependency is indicated.

In response to determining that the previously stored memory transaction blocks the cache management transaction, the method includes establishing, by the retry queue circuit, a dependency to the blocking memory transaction by adding a pseudo victim address to the cache management transaction (block 606). Retry queue circuit 120, for example, generates pseudo victim address 146 with a value that is based on address 142a. Pseudo victim address 146 is then stored in the victim address field 126 for the queue entry corresponding to transaction 145a. The method ends in block 608.

It is noted that method 600 is an example technique for operating a retry queue circuit. Some embodiments may include additional operations, such as, for example, an addition operation to generate the pseudo victim address.

Figure 7:
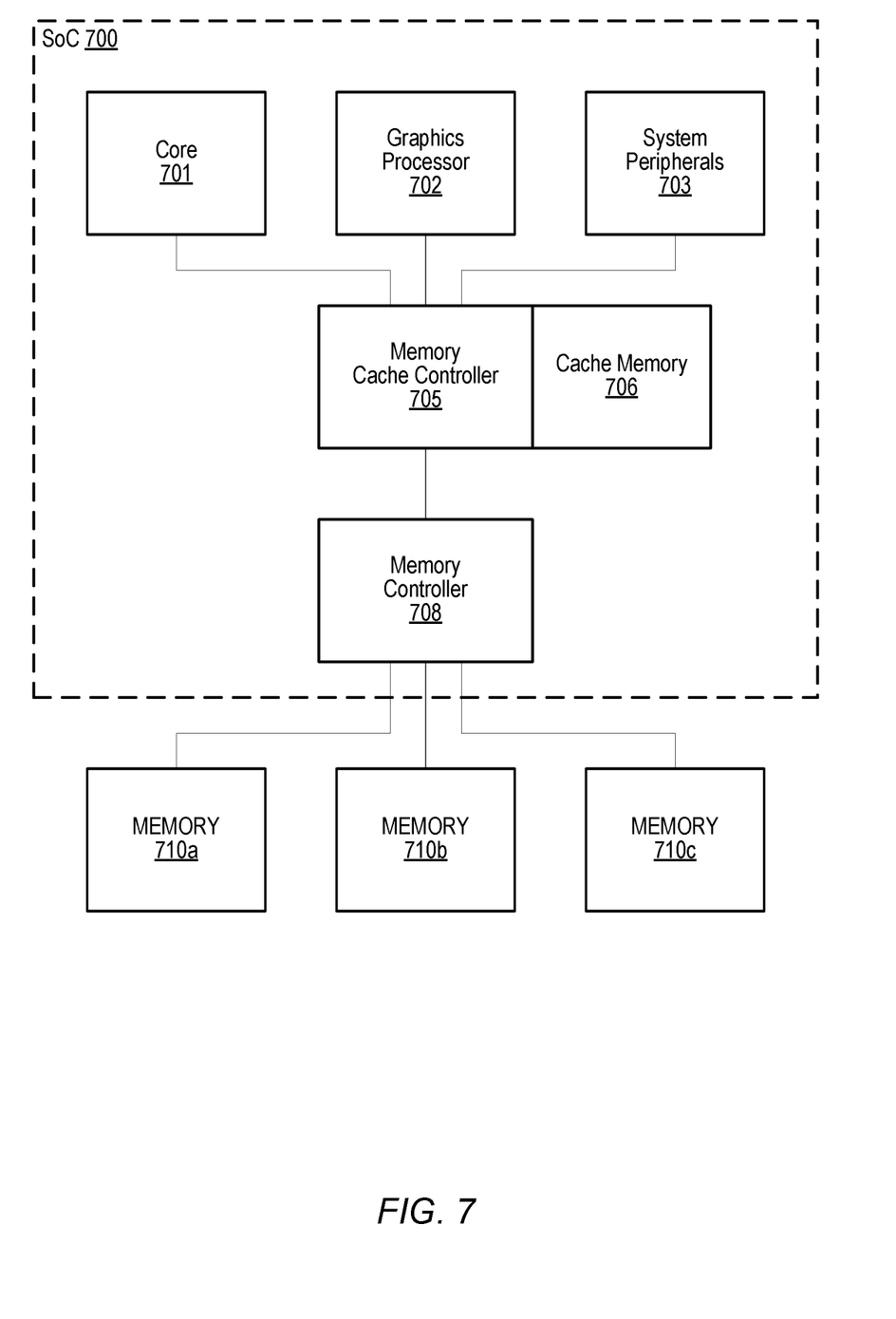
FIG. 7 depicts a block diagram of an embodiment of a system-on-chip (SoC).

A block diagram of an embodiment of a computer system, such as, for example, a system-on-chip (SoC), is illustrated in FIG. 7. Computer system 700 may be representative of computer systems 10 or 30 in FIGS. 1 and 3, respectively, and may utilize the concepts disclosed above. Computer system 700, in various embodiments, may be a system implemented on one or more circuit boards, including a plurality of integrated circuits, or may be an SoC integrated onto a single computer chip, or may be implemented as a combination thereof. Computer system 700 includes several processing cores, including core 701, graphics processor 702, and system peripherals 703, all coupled to memory cache controller 705. Memory cache controller 705 is coupled to cache memory 706 and to memory controller circuit 708. Memory controller circuit 708 is coupled to memories 710a-710c.

In the illustrated embodiments, core 701 is representative of a general-purpose processing core that performs computational operations. Although a single processing core, i.e., core 701, is illustrated, in some embodiments core 701 may correspond to a core complex that includes any suitable number of processing cores. In various embodiments, core 701 may implement any suitable instruction set architecture (ISA), such as, e.g., ARM™, PowerPC®, Blackfin®, or x86 ISAs, or combination thereof. Core 701 may execute instructions and utilize data stored in memories located outside of computer system 700, such as, for example, memories 710a-710c, by issuing memory transactions to fetch the instructions and data to be utilized. Data and instructions fetched from memories 710a-710c may be cached in cache memory 706. In some embodiments, core 701 may include one or more cache memories in addition to cache memory 706.

Graphics processor 702, in the illustrated embodiment, includes circuitry for processing images or video to be sent to a display screen (not shown). In some embodiments, images and/or videos to be processed by graphics processor 702 may be stored in memories 710a-710c. Memories 710a-710c may also store graphics processing instructions for use by graphics processor 702 to generate the images. Graphics processor 702 may correspond to a processing core capable of issuing memory transactions to retrieve graphics data and instructions. Data retrieved from memories 710a-710c may be cached in cache memory 706.

In the illustrated embodiment, system peripherals 703 includes one or more circuit blocks for performing any number of suitable tasks. For example, in various embodiments, system peripherals 703 may include any one or more of communication peripherals (e.g., universal serial bus (USB), Ethernet), encryption engines, audio processors, direct memory access modules, or any other peripheral that may generate memory transactions to retrieve data or commands from memories 710a-710c. System peripherals 703 may include one or more processing cores within the various functional circuits that are capable of issuing memory transactions to memory cache controller 705.

In the illustrated embodiment, memory cache controller 705 corresponds to memory cache controller 100 or 300 in FIGS. 1 and 3, respectively. Memory cache controller 705 includes circuits for managing memory transactions issued by core 701, graphics processor 702, and system peripherals 703. In the illustrated embodiment, memory cache controller 705 decodes memory transactions, translates addresses, and determines if valid content corresponding to the addressed location is currently in cache memory 706, or if this data is to be fetched from memories 710a-710c or elsewhere. If valid content is not currently cached in cache memory 706, then memory cache controller 705 may send the transaction to memory controller circuit 708 to fetch the requested data. In some embodiments, computer system 700 may include more than one cache memory 706 and may, therefore, include a respective memory cache controller 705 for each cache memory 706.

In some embodiments, memory controller circuit 708 may include one or more memory controller circuits for fulfilling memory transactions from each of memories 710a-710c. For example, one memory controller circuit may be included for each of memories 710a-710c. In the illustrated embodiment, memory controller circuit 708 includes circuits used to read and write data to each of memories 710a-710c. Memory controller circuit 708 receives memory transactions from memory cache controller 705 if valid content corresponding to the transaction's address is not currently stored in cache memory 706.

In some embodiments, memories 710a-710c may correspond to memory circuit 370. Memories 710a-710c are storage devices that collectively form at least a portion of memory hierarchy that stores data and instructions for computer system 700. More particularly, memories 710a-710c may correspond to volatile memory with access times less than a non-volatile memory device. Memories 710a-

710c may, therefore, be used to store instructions and data corresponding to an operating system and one or more applications read from a non-volatile memory after a system boot of computer system 700. Memories 710a-710c may be representative of memory devices in the dynamic random-access memory (DRAM) family of memory devices or in the static random-access memory (SRAM) family of memory devices, or in some embodiments, a combination thereof.

It is also noted that, to improve clarity and to aid in demonstrating the disclosed concepts, the diagram of computer system 700 illustrated in FIG. 7 has been simplified. In other embodiments, different and/or additional circuit blocks and different configurations of the circuit blocks are possible and contemplated.

Figure 8:
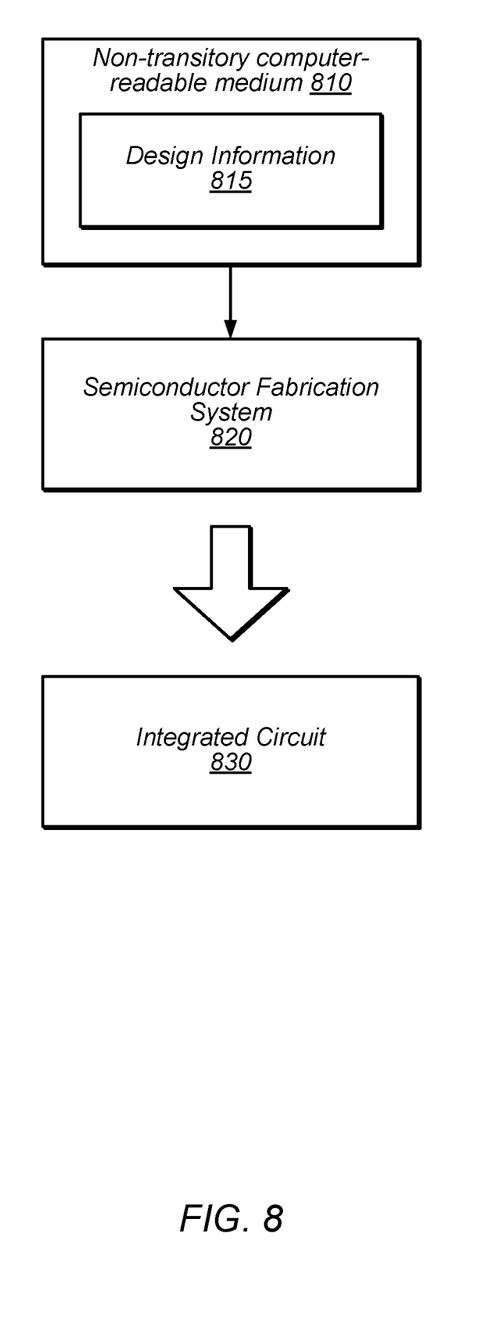
FIG. 8 illustrates a block diagram depicting an example computer-readable medium, according to some embodiments.

FIG. 8 is a block diagram illustrating an example of a non-transitory computer-readable storage medium that stores circuit design information, according to some embodiments. The embodiment of FIG. 8 may be utilized in a process to design and manufacture integrated circuits, such as, for example, an IC that includes computer system 700 of FIG. 7. In the illustrated embodiment, semiconductor fabrication system 820 is configured to process the design information 815 stored on non-transitory computer-readable storage medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system, such as semiconductor fabrication system 820, for example. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a transaction arbiter circuit configured to determine whether a received memory transaction can currently be processed by a transaction pipeline; and
   a retry queue circuit configured to queue, in respective entries, memory transactions that the transaction arbiter circuit determines cannot be processed by the transaction pipeline, wherein the queued entries include a target address field and a victim address field; and
   wherein the retry queue circuit, in response to receiving a memory transaction that is a cache management transaction, is configured to:
      prior to attempting a retry of the cache management transaction, make a determination that a previously stored memory transaction blocks the cache management transaction based on queued entries for both the previously stored memory transaction and the cache management transaction having a common address in the target address field;
in response to the determination, establish a dependency from the cache management transaction to the previously stored memory transaction by assigning a value to the victim address field in the queued entry for the cache management transaction; and
initiate a retry, by the transaction pipeline, of one or more of the queued memory transactions in the retry queue circuit that are not blocked by the dependency.

2. The apparatus of claim 1, wherein the retry queue circuit is further configured to wait to retry the cache management transaction until the previously stored memory transaction has been processed.

3. The apparatus of claim 1, wherein to establish the dependency from the cache management transaction to the previously stored memory transaction, the retry queue circuit is further configured to store the common address in the victim address field.

4. The apparatus of claim 1, wherein the retry queue circuit is further configured to identify, in response to a determination that a different memory transaction includes an indication of a victim address that corresponds to the common address, a different dependency from the cache management transaction to the different memory transaction previously stored in the retry queue circuit.

5. The apparatus of claim 1, further comprising a cache management circuit configured to generate the cache management transaction, wherein in the cache management transaction includes a management command for a cache memory.

6. The apparatus of claim 5, wherein the management command includes a command to flush a portion of the cache memory.

7. The apparatus of claim 1, wherein the retry queue circuit is further configured to establish the dependency, in response to a determination that the previously stored memory transaction would return erroneous data if processed after the cache management transaction.

8. A method, comprising:
storing, by an arbitration circuit, a cache management transaction in a respective entry in a retry queue circuit, in response to determining that the cache management transaction is currently unable to be processed, wherein the stored entry includes a target address field and a victim address field;
prior to attempting a retry of the cache management transaction, determining that a previously queued memory transaction in a respective entry in the retry queue circuit blocks the cache management transaction based on the target address field included in the respective entry for the previously queued memory transaction corresponding to the target address field included in the respective entry for the cache management transaction;
in response to determining that the previously queued memory transaction blocks the cache management transaction, establishing a dependency, by the retry queue circuit, from the cache management transaction to the blocking memory transaction by assigning a value to the victim address field in the stored entry for the cache management transaction;
initiating a retry, by the retry queue circuit, of the blocking memory transaction; and initiating a retry, by the retry queue circuit, of the cache management transaction, in response to determining that the blocking memory transaction has been processed.

9. The method of claim 8, further comprising receiving the cache management transaction from a control circuit that is configured to generate cache management transactions, and receiving the blocking memory transaction from a system interface that is configured to receive memory transactions from one or more processing circuits.

10. The method of claim 8, wherein assigning the value to the victim address field includes storing the value of the target address field to the victim address field for the cache management transaction.

11. The method of claim 8, further comprising, determining that a previously queued different memory transaction blocks the cache management transaction based on an indication of a victim address in the different blocking memory transaction corresponding to the target address field of the cache management transaction.

12. The method of claim 11, further comprising:
initiating a retry, by the retry queue circuit, of the different blocking memory transaction; and
wherein the initiating a retry of the cache management transaction includes initiating a retry of the cache management transaction, in response to determining that both the blocking memory transaction and the different blocking memory transaction have been processed.

13. The method of claim 12, wherein the cache management transaction includes a command to clear a dataset identification associated with data stored in a cache memory.

14. The method of claim 8, wherein the determining that the previously queued memory transaction blocks the cache management transaction includes determining that the previously queued memory transaction would return erroneous data if processed after the cache management transaction.

15. An apparatus, comprising:
a transaction arbiter circuit configured to:
receive a plurality of memory transactions, including a cache management transaction; and
determine whether a received memory transaction can currently be processed by a transaction pipeline; and
a retry queue circuit configured to:
queue, in respective retry queue entries, a subset of memory transactions that the transaction arbiter circuit determines cannot be processed by the transaction pipeline, wherein the retry queue entries include a target address field and a victim address field; and
in response to receiving a memory transaction that is a cache management transaction, determine, prior to attempting a retry of the cache management transaction, that a previously queued memory transaction in the retry queue circuit blocks the cache management transaction, wherein the determination of the blocking is based on the target address field in a queued retry queue entry for the cache management transaction; and
in response to the determination that the previously queued memory transaction blocks the cache management transaction, modify the victim address field in the queued retry queue entry for the cache management transaction to establish a dependency to the previously queued memory transaction.

16. The apparatus of claim 15, wherein to determine that the previously queued memory transaction blocks the cache management transaction, the retry queue circuit is further configured to determine that a value of the target address field in the queued retry queue entry for the cache management transaction and a value of the target address field in the respective retry queue entry for the previously queued memory transaction are a common address value.

17. The apparatus of claim 16, wherein to modify the value in the victim address field, the retry queue circuit is further configured to store the common address value of the target address field in the victim address field of the queued retry queue entry for the cache management transaction.

18. The apparatus of claim 15, wherein the retry queue circuit is further configured to determine that execution of the cache management transaction is blocked by a different queued memory transaction in the retry queue circuit, based on the different queued memory transaction including a victim address that corresponds to a target address of the cache management transaction.

19. The apparatus of claim 18, wherein to initiate a retry of the cache management transaction, the retry queue circuit is further configured to wait to initiate the retry of the cache management transaction until both blocking memory transactions have been processed in the transaction pipeline.

20. The apparatus of claim 15, further comprising:
- a control circuit configured to generate the cache management transaction; and
- a system interface configured to receive memory transactions from one or more processing circuits;
- wherein the blocking memory transaction is received via the system interface and the cache management transaction is received from the control circuit.

* * * * *